United States Patent
Kaag et al.

(10) Patent No.: US 9,979,203 B2
(45) Date of Patent: May 22, 2018

(54) POWER SUPPLY SYSTEM USING A FUEL CELL, CONTROLLER FOR THE SAME AND CONTROL METHOD

(71) Applicant: PHILIPS LIGHTING HOLDING B.V., Eindhoven (NL)

(72) Inventors: Bjorn Christiaan Wouter Kaag, Eindhoven (NL); Rainer Hilbig, Eindhoven (NL); Mareike Klee, Eindhoven (NL)

(73) Assignee: PHILIPS LIGHTING HOLDINGS B.V., Eindhoven (NL)

( * ) Notice: Subject to any disclaimer, the term of this patent is extended or adjusted under 35 U.S.C. 154(b) by 174 days.

(21) Appl. No.: 14/896,756

(22) PCT Filed: Jun. 3, 2014

(86) PCT No.: PCT/EP2014/061471
§ 371 (c)(1),
(2) Date: Dec. 8, 2015

(87) PCT Pub. No.: WO2014/202381
PCT Pub. Date: Dec. 24, 2014

(65) Prior Publication Data
US 2016/0134124 A1    May 12, 2016

(30) Foreign Application Priority Data

Jun. 18, 2013 (EP) .................................... 13172457
Mar. 12, 2014 (EP) .................................... 14159012

(51) Int. Cl.
*H02J 4/00*    (2006.01)
*H02J 1/00*    (2006.01)
(Continued)

(52) U.S. Cl.
CPC ............. *H02J 4/00* (2013.01); *H01M 8/0656* (2013.01); *H01M 10/46* (2013.01);
(Continued)

(58) Field of Classification Search
CPC .... H01J 1/00; H01J 4/00; H01J 7/0068; H01J 7/34; H01J 2001/004; H01M 8/0656;
(Continued)

(56) References Cited

U.S. PATENT DOCUMENTS 7,550,036 B2    6/2009  Lee et al.
2008/0024007 A1*  1/2008  Budampati ............... H02J 1/08
                                                    307/19
(Continued)

FOREIGN PATENT DOCUMENTS

CN    103025028 A    4/2013
EP    1975279 A1    10/2008
(Continued)

*Primary Examiner* — John Poos

(57) ABSTRACT

A power supply system comprises a fuel cell and a battery, each for supplying electrical power to a load. The system is controlled to use the fuel cell for a first period of time (82) to supply electrical power to the load, wherein the power demand is constant over a first time period (82). The battery is used simultaneously with the fuel cell for a second supply time of electrical power to the load, wherein the power varies (84). In this way, fluctuating output is provided by the battery, and the fuel cell output is maintained as constant as possible to prolong the lifetime. During the second supply time, the power to the load (80) can be provided as a constant contribution from the fuel cell and a variable contribution from the battery.

16 Claims, 14 Drawing Sheets

(51) Int. Cl.
    *H02J 7/00*      (2006.01)
    *H02J 7/34*      (2006.01)
    *H01M 8/0656*    (2016.01)
    *H01M 10/46*     (2006.01)
    *H01M 16/00*     (2006.01)
    *H05B 37/02*     (2006.01)

(52) U.S. Cl.
    CPC .............. *H01M 16/006* (2013.01); *H02J 1/00* (2013.01); *H02J 7/0068* (2013.01); *H02J 7/34* (2013.01); *H05B 37/0218* (2013.01); *H01M 2220/10* (2013.01); *H01M 2250/10* (2013.01); *H02J 2001/004* (2013.01); *Y02B 90/14* (2013.01); *Y02P 90/40* (2015.11)

(58) Field of Classification Search
    CPC ............... H01M 10/46; H01M 16/006; H01M 2210/10; H01M 2250/10
    USPC .......................... 307/18, 19, 20, 21
    See application file for complete search history.

(56) References Cited

U.S. PATENT DOCUMENTS

| | | |
|---|---|---|
| 2011/0139299 A1 | 6/2011 | Dederick |
| 2012/0080944 A1 | 4/2012 | Recker |
| 2014/0292084 A1 | 10/2014 | Corson |

FOREIGN PATENT DOCUMENTS

| | | |
|---|---|---|
| JP | 2002369413 A | 12/2002 |
| WO | 2002097909 A1 | 12/2002 |

\* cited by examiner

POWER SUPPLY SYSTEM USING A FUEL CELL, CONTROLLER FOR THE SAME AND CONTROL METHOD

CROSS-REFERENCE TO PRIOR APPLICATIONS

This application is the U.S. National Phase application under 35 U.S.C. § 371 of International Application No. PCT/EP2014/061471, filed on Jun. 3, 2014, which claims the benefit of European Patent Application No. 13172457.7, filed on Jun. 18, 2013 and European Patent Application No. 14159012.5, filed on Mar. 12, 2014. These applications are hereby incorporated by reference herein.

FIELD OF THE INVENTION

This invention relates to power supply systems using a fuel cell, and relates to a controller for controlling such a system, as well as the system itself and a control method.

BACKGROUND OF THE INVENTION

The invention can be applied to a variety of applications.

One range of applications is solar powered systems where the fuel cell provides back up power to enable solar input variations to be tolerated. These solar input variations can be due to short term weather changes, but also can relate to sunrise and sunset time changes during the course of a year. A solar powered system may comprise a lighting system, such as street lighting or outdoor lighting.

The use of a regenerative fuel cell enables photovoltaic ("PV") cell over dimensioning to be avoided. It also provides backup capacity to bridge several days of bad weather.

Another application is an oxygen generator for use in the administration of oxygen as a therapeutic modality.

For on-demand generation of oxygen, so-called oxygen concentrators have been developed in the past. The corresponding technology is well described in U.S. Pat. No. 6,551,384, for example. Currently, mobile oxygen generators are powered by batteries. On the highest oxygen generation setting, the user can experience a relatively fast drain of the batteries. When the batteries are depleted, the user needs to visit a location with a wall socket to enable the system to charge the batteries from the grid. Naturally the user can carry spare packs with him while on the move, but this adds weight.

For increased autonomy of a portable oxygen generator, a fuel cell can be used. A fuel cell system can provide relatively long periods of energy supply without connection to a wall socket to charge batteries. The lifetime of PEM fuel cells is an issue, particularly if the fuel cell is exposed to traces of CO as the membrane will suffer degradation. To extend the service life of a fuel cell stack, it can be over-dimensioned, or air filtering can be employed or a source of pure oxygen can be provided.

In both of the above mentioned examples, there is, based on the nature of the load, not a constant, flat production demand for electrical power from the fuel cell. In the lighting case, demand varies during the course of the night, as well as seasonally. In the oxygen generator case, the demand depends on the user. Other such variable demands will be apparent.

One way to design a system including a fuel cell is to design the system for the effect of having maximum service life and minimal on/off cycles. In the case of an oxygen generator, this requires a constant oxygen production for the fuel cell, and variations in patient's oxygen demand are to be produced on top of that.

Further, in an apparatus with a fuel cell and a battery, there are conflicting usage requirements to enable the battery life and the fuel cell life to be maximised. WO02/097909 discloses a hybrid power supply system in which a fuel cell is operated in a quasi-steady state mode. The fuel cell is operated at one of a discrete set of output currents in dependence on a state of charge of a battery. In particular, the fuel cell current setting is selected to meet current accepting limitations of a battery when charged using a constant voltage charge regime.

This document recognises that both the fuel cell operation and battery charging functions can each be optimised to extend lifetime. It is aimed at applications which have loads which are always fluctuating in demand.

SUMMARY OF THE INVENTION

The current invention inter alia aims at optimising with respect to any one of, or both of the aforementioned effects. The invention is defined by the independent claims. The dependent claims define advantageous embodiments.

The controller according to the invention is for controlling a (preferably the total) supply of electrical power to a load from both at least one fuel cell and at least one auxiliary/secondary power supply. The controller is configured to, during the second supply time period, simultaneously use the at least one fuel cell (24) for a constant second supply of electrical power to the load, and the at least one secondary power supply (36) for an additional second supply of electrical power to the load, wherein the level of the constant second supply of electrical power is lower than the level of the constant first supply of electrical power.

The controller thus enables that the fuel cells electrical power output is held at a constant reduced level in the second supply time period compared to the level during the first supply time period. Therewith this controller enables that the fuel cell lifetime and thus also a power supply system including such a fuel cell can have an extended lifetime by providing a recovery time for the fuel cell in the second supply time period. Also, lifetime extension for the fuel cell and the system can be obtained due to fact that the secondary power source is used for coping with rapid changes in power demand by the load. The constant first and/or second supply of electrical power to the load by the fuel cell can comprise constant voltage or constant current supply of electrical power.

Preferably the second supply time period is different from the first supply time period. The second supply time period preferably follows (or is even directly after) the first supply time period. The periods may be chosen such that in going from the first to the second the fuel cell power output can simply be throttled back.

The constant first supply of electrical power to the load can be lower than the electrical power supply to the load, such that it provides a part of the entire power demand of the load. This enables fuel cell recovery time and variable power demand during the first and second supply time periods.

Alternatively the constant first supply of electrical power can be the same as the entire electrical power supply to the load (i.e. is the same as the entire power demand by a load. The controller now enables that a constant power is supplied by the fuel cell only, so that cycling of the secondary power supply can be kept to a minimum in order to increase its lifetime.

The invention enables a particularly efficient and long life implementation of a system including a fuel cell and a secondary power supply for loads which have periods of constant demand and/or periods of variable demand. While the invention may extend lifetime of the fuel cell and that of the secondary power source, power provision to a load does not need to be ceased or reduced as the second power supply can at least make up for the difference in power supply by the fuel cell.

The power produced by the fuel cell is constant during the first and second supply time periods. If still a variable power supply is needed by the load, the additional second power supply can be a variable power supply. Thus, while the fuel cell still enjoys lifetime extension by constant power supply and is able to recover during the second supply time period, the secondary power supply (e.g. a battery) can be used for coping with (rapid) changes in power demand.

After the second supply time period there can be a third supply time period in which a constant third supply of electrical power is delivered by the fuel cell to the load. The third supply of electrical power can be increased with respect to, be the same as, or be higher than, the constant second supply of electrical power. Thus, after the fuel cell regeneration (recovery), the fuel cell may be reverted to a higher power level (e.g. as in another first supply time period). This approach helps to increase the lifetime of the secondary power supply when it is implemented as e.g. a battery, as the battery is stressed less.

In one alternative, the third supply of electrical power is the same as the first supply of electrical power.

In the invention the secondary power supply can comprise a rechargeable device. This may be an electrically rechargeable electrical device such as a rechargeable battery. Different types of rechargeable batteries can be used including metal hydride, Li-ion, and the like.

Preferably, after the fuel cell regeneration (recovery) in the second supply time period, the fuel cell can be used to, in the third supply time period recharge the rechargeable secondary power supply (e.g. a rechargeable battery) to ensure the secondary power supply (e.g rechargeable battery) is recharged, preferably (back) to its ideal state of charge. The recharging of the battery can also be controlled in dependence on the demand from the output load, and again to keep to a minimum the variations in the fuel cell output. The controller can be further adapted to cease supply of electrical power from the fuel cell during a fourth supply time period. When a rechargeable secondary power source (e.g. a battery) is used, the fourth supply time period will be used when there is no power demand by the load and the secondary power source also does not need recharging.

When a rechargeable secondary power source (e.g. a battery) is used, the battery charging can be controlled to extend the battery lifetime. For example, the controller can be adapted to:
  supply electrical power to the load from the battery until a predetermined voltage is present, which is greater than a minimum voltage to which the battery can be discharged.

By avoiding full discharge, the battery life can be extended, particularly for lead and lithium ion batteries. The predetermined minimum voltage can be 5% to 20% of the maximum voltage to which the battery can be charged The controller can be adapted to recharge the battery to a predetermined maximum voltage which is below the maximum voltage to which the battery can be charged. By avoiding full charging, the battery life can be extended, particularly for lithium ion batteries, which suffer from high state of charge.

The predetermined maximum voltage can be 70 to 95% of the maximum voltage to which the battery can be charged, and this can depend on the charge rate. The controller can be adapted to implement a delay before recharging the battery after the discharging to the predetermined battery voltage.

The controller can be adapted to recharge the battery from the fuel cell using only a constant current charging. This enables the power demand on the fuel cell to be kept constant during the charging phase, therewith again extending the lifetime of the fuel cell.

The controller can be adapted to progressively lower the fixed charging rate during the constant current phase of the charging, so more charge can be injected into the battery, but the system shall provide that the total overall load (for charging and another load such as for example the light or auxiliary systems) remains of a constant level, so the fuel cell can continue to produce the same overall power level.

The controller can be configured to switch off the fuel cell periodically and the required supply provided by the battery, or else the fuel cell can be used continuously, but with period throttling back.

As mentioned above, the invention (controller, system including the controller or method of controlling) is of particular interest for applications where there is a known period of constant load demand which can be met during the first supply time period. For example, in the case of a lighting application, the first supply time period may be a period when the light is required to be run at maximum brightness, thereby with a constant power demand. In the case of street lighting, this may be during peek traffic hours at the end of the night and in the early morning. The secondary power supply does not need to be used for that period, so that battery life is extended by reducing battery cycling.

The controller can be further configured to control the first, the second and/or third supply periods and the corresponding power levels automatically in dependence on the time of year.

The invention also provides a system comprising the controller and at least one of, or both of a fuel cell and a secondary power supply. As explained such system can be advantageously used for supply of constant or variable power to a load while the systems lifetime is extended with respect to a system not having the controller.

In this and any other aspect of the invention (e.g. controller, method of control and computer program product) the fuel cell can be hydrogen, alcohol or other fuel based. The secondary power supply can be an electrical power supply and/or a rechargeable power supply. Preferably the secondary power supply is battery or even a rechargeable battery.

Additionally the system can comprise the load. In a first example the load can comprise a lighting unit, outdoor lighting unit, or a street lighting unit. The system can then have a dimming controller, for example for applying an adaptive dimming power profile to the load where the output of the load is adapted using an external input such as e.g. ambient light level. The dimming controller can be configured to use the secondary power supply for the variable part of the of the adaptive dimming power profile. The dimming controller can be separate from or integrated in the controller of the invention. The controller or system can comprise a light sensor for measuring the ambient light level and connection means to transmit a determined light level to the controller.

The system can further comprise a solar panel. The fuel cell provides back up power, and the fuel can be replenished. In one example, a system for recharging the fuel cell can be provided using the electricity generated by the solar panel. This enables a stand-alone system. The system for recharging the fuel cell can comprise:
 a water tank for storing water generated by the fuel cell;
 an electrolyser for generating hydrogen from the water;
 a hydrogen storage vessel; and
 a compressor for compressing the hydrogen and providing it to the hydrogen storage vessel.

In a second example, the load can comprise an oxygen generator for generating oxygen from ambient air. This can be used for oxygen therapy.

In the invention other loads than those mentioned above can be used without loss of effect of the invention.

The invention also provides a method of providing a power supply to a load using a system having a fuel cell and a secondary power supply. All features and their advantages as described for the controller and/or system can be used for correspondingly varying the method of the invention and vice versa.

The controller can be implemented as a standard component which is suitably programmed such that it can perform any of the control methods of the invention. Accordingly, the invention also provides a computer program or computer program product comprising code means which, when run on a computer, is able to perform any of the methods according to the invention. The computer program product can be included in the controller and/or the system, but can also be provided separate from the controller or system.

The controller can have connection points to connect to one or more of a fuel cell, secondary power supply and load. Such connections being for transmitting signals to operate switching of the corresponding connected items via hardwire or wireless means. Alternatively, the controller can have input connections for directly connecting to the output power connection of a fuel cell, of a secondary power supply. It then also may have separate output power connections corresponding to the two power sources or have a combined single output power connection for connecting to the load.

BRIEF DESCRIPTION OF THE DRAWINGS

Examples of the invention will now be described with reference to the accompanying drawings in which.

DETAILED DESCRIPTION

The invention provides a controller for a power supply system (and the power supply system itself) comprising a fuel cell and a secondary power supply such as a battery, each for supplying electrical power to a load. The system is controlled to use the fuel cell for a first supply of electrical power to the load, wherein the first supply is constant over a first time period. The battery is used for a second supply of electrical power to the load, wherein the second supply varies. In this way, fluctuating output is provided by the secondary supply, and this means the fuel cell output is maintained as constant as possible to prolong the lifetime. During the second supply time, the power to the load can be provided as a constant contribution from the fuel cell and a variable contribution from the battery.

The invention makes use of fuel cell technology, and in some examples regenerative fuel cell technology. This has been used in the Gemini space flights in the 60s and has been studied intensively in the 90s. Examples of state of the art product announcements are for example the "Greenergy" system of Areva which is a very large scale, 2 MWh, 200 kW-2 MW power system. It uses a regenerative fuel cell system with H2 and O2 stored, exhaust water released and new water taken from the water grid. The "Xstorra" of Infinity is large scale, 5 kW power system with H2 stored and O2 released. Exhaust water is released and new water is taken from the water grid.

One application of the invention is for a self-contained street lighting system. This application requires very small power and large capacity without needing a water supply. Another application is for an oxygen generator.

Two implementations of an Off grid System Lighting ("OSL") system will first be described, and to which the invention can be applied. An example of oxygen generated will then be described, again to which the invention can be applied. Finally, a detailed example of how to apply the invention to a lighting application will then be provided.

Figure 1:
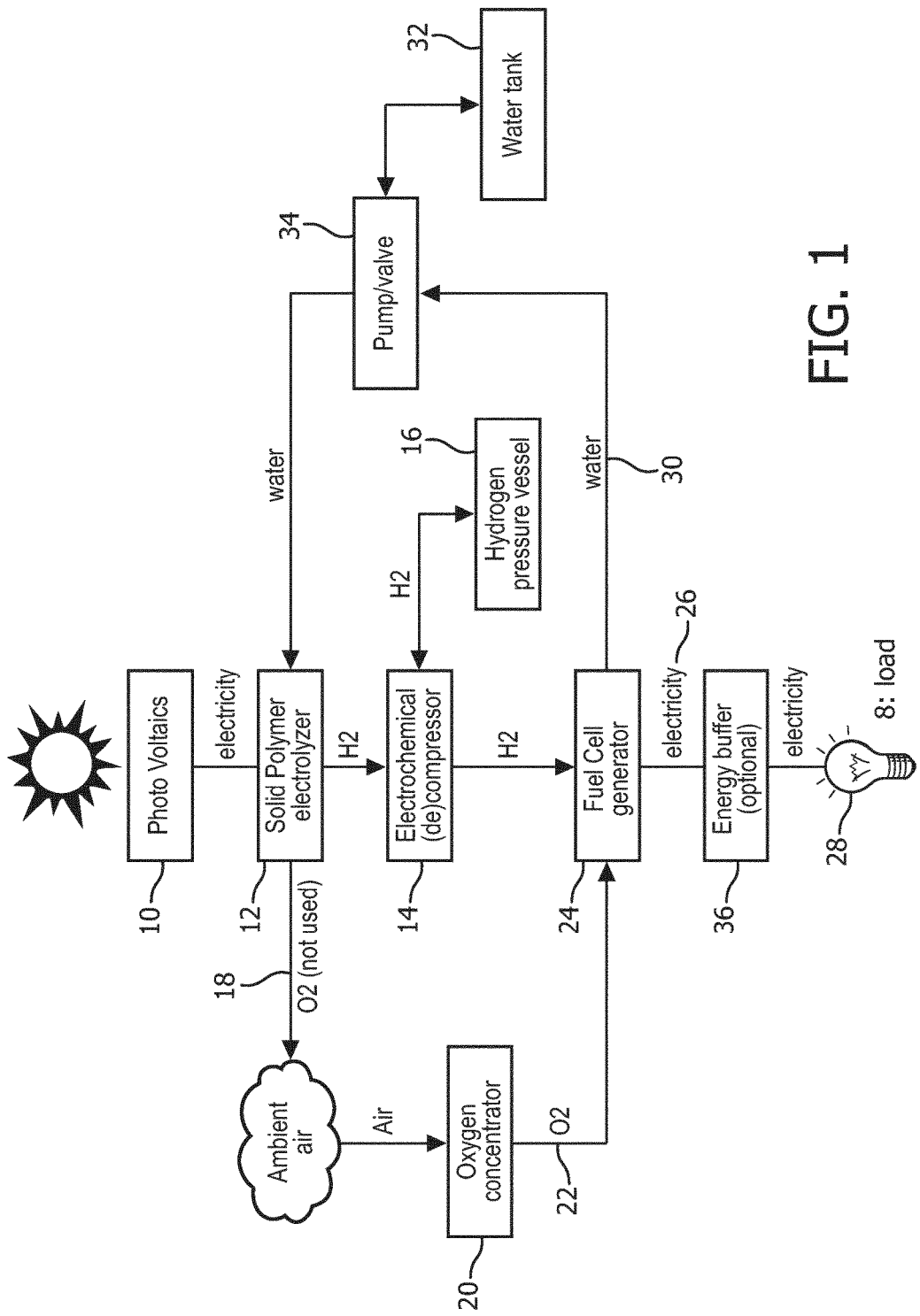
FIG. 1 shows a first example of lighting system to which the invention can be applied.

FIG. 1 shows a first example in which O2 and H2 are generated to drive the fuel cell at the highest possible energy efficiency, but only the H2 is stored. The O2 is released into the ambient air. When the fuel cell needs to generate power, the required O2 is concentrated from ambient air with the support of an oxygen concentrator.

The system comprises a solar PV array 10 which generates electricity. The solar generated electricity is used by an electrolyser 12 to split water into hydrogen and oxygen. The electrolyser can generate very pure hydrogen. The hydrogen is compressed by compressor 14 and stored in a (lightweight) pressure vessel 16, while the oxygen 18 is released into the air.

An electrochemical compressor 14 will use electrical energy during compression of the hydrogen but regains most of the energy back during decompression.

An oxygen concentrator 20 filters ambient air and creates very pure oxygen 22. The clean/pure oxygen and hydrogen are offered to the fuel cell 24. The fuel cell 24 generates electricity 26 to provide power to the load 28 and produce waste heat and water at the exhaust 30. Note that the electrolyser and fuel cell can be combined in a unitised regenerative fuel cell.

The water is collected and stored in a water tank 32, for example using a pump 34 for renewed use in the electrolyser 12. The waste heat is reused in the thermal system to keep the fuel cell and other components at an optimal working temperature. An energy buffer, e.g. a battery 36 is also shown.

The various functions are now described in more detail. The sun provides insolation for the Photo Voltaics 10, which generate electricity. A state of the art solar charger will find the optimal working point under all temperature and irradiance levels. A backup energy source 36 in the form of a battery starts the processes, absent sunlight.

The solid polymer electrolyser 12 ("SPE") is offered water from the local water tank and electricity from PV, to split water to generate Hydrogen (H2) and Oxygen (O2). The SPE 12 can generate moderate pressures of up to 20-30 bar and implements adaptive control to cope with the intermittency of the solar power profile. The control system implements dynamic control strategies to maximize H2 (and O2) production under intermittent solar profiles. This new function is comparable with maximum power point tracking ("MPPT") in a solar charger: the system will always find the most optimal working point of the SPE under altering power conditions.

The O2 is released into the air in a way to avoid corrosion and unsafe conditions. A sensor may detect the wind flow speed. The system may use this information to determine if it is "safe" to release O2 during calm periods. If not, the system may eventually decide to halt offloading the O2: this may happen for example by halting the electrolyser or temporarily store some of the gas in a small buffer or an entirely different strategy to prevent unsafe conditions.

The resultant H2 gas from the SPE 12 is directed to the electrochemical compressor 14 either directly or via a buffer between the electrolyser and the electrochemical compressor. The electrochemical compressor compresses the gas to high pressures and stores this in the hydrogen pressure vessel 16. This step will consume electrical energy. The electrochemical compressor may be a separate component or may be integrated into the hydrogen storage pressure vessel. The control system finds the optimal working point for the electrochemical compressor to be able to cope with fluctuating H2 supply, as may happen due to the electrolyser being driven by intermittent solar power. The control system will also implement a strategy against back diffusion, with valves or solenoids for example.

When the regenerative fuel cell ("RFC") system switches on load 28, the fuel cell generator may directly provide electricity to power the load and/or the system may use the energy buffer 36 (e.g. a battery) between the load 28 and the generator 24 to facilitate buffering of load fluctuations when the load would for example implement adaptive light dimming during (parts of) the night or is switched on during a solar eclipse or other intermittent lighting events. This adaptive light dimming control adapts the lighting level in response to ambient light conditions, for example based on light sensing or progressively as a function of the time of day/night.

The reactant gases must be provided to the fuel cell generator to be able to generate power. A fuel cell based on proton exchange membrane ("PEM") technology requires H2 and O2 for its chemical process.

Reactant gas hydrogen is fed from the hydrogen pressure vessel 16. The electrochemical (de)compressor 14 scavenges electrical power from the energy that is contained in the pressure of the compressed hydrogen gas. The electrochemical (de)compressor 14 expands the high pressure from the hydrogen pressure vessel 16 to the lower input pressure of the fuel cell generator 24. During this step the electrochemical (de)compressor will "generate" electrical energy. The control system finds the optimal working point of the electrochemical (de)compressor to be able to cope with eventual fluctuating H2 demand, as may happen when the fuel cell generator would have to adapt to a fluctuating load (for example adaptive dimming).

The control system also implements a strategy for safety, with valves or solenoids for example. A small overpressure of typically 2-5 bar increases performance in PEM fuel cells. It is well known that a moderate overpressure of reactant gas yields higher fuel cell performance.

The oxygen required to drive the chemical fuel cell reaction is produced from ambient air by the oxygen concentrator 20. The oxygen generator 20 filters the ambient air and removes traces of CO, which may occur in polluted air in e.g. cities or industrial sites. Since CO is a poison to the membrane of the PEM fuel cell and CO would degrade the life of the fuel cell generator, the oxygen concentrator will increase life of the fuel cell generator. It is well known that pure and clean oxygen yields higher fuel cell performance and longer life.

The fuel cell generator's chemical reaction will result in electricity to power the load, but also water at the exhaust and (waste) heat. The water is accumulated into the water tank 32, which may be supported by a water pump and/or valve 34. The waste heat may be used to store heat in the water tank to prevent the tank from freezing up in very cold winter conditions: the heat may be used to heat the water or to "dump" it into Phase Change Materials or entirely different means.

A suitable thermal design of the water tank will make sure that a minimal amount of energy is required to keep the water liquid. In addition to insulation the system may implement a heater in the water tank to cope with extreme winter conditions, in conjunction with the energy buffer 36 that allows the system to start that heater. The fuel cell generator and/or SPE can optionally work in a mode to produce heat for anti-freeze operation. Subsequently, the water can be offered to the Solid Polymer Electrolyser 12. The process repeats and the loop is complete.

Figure 2:
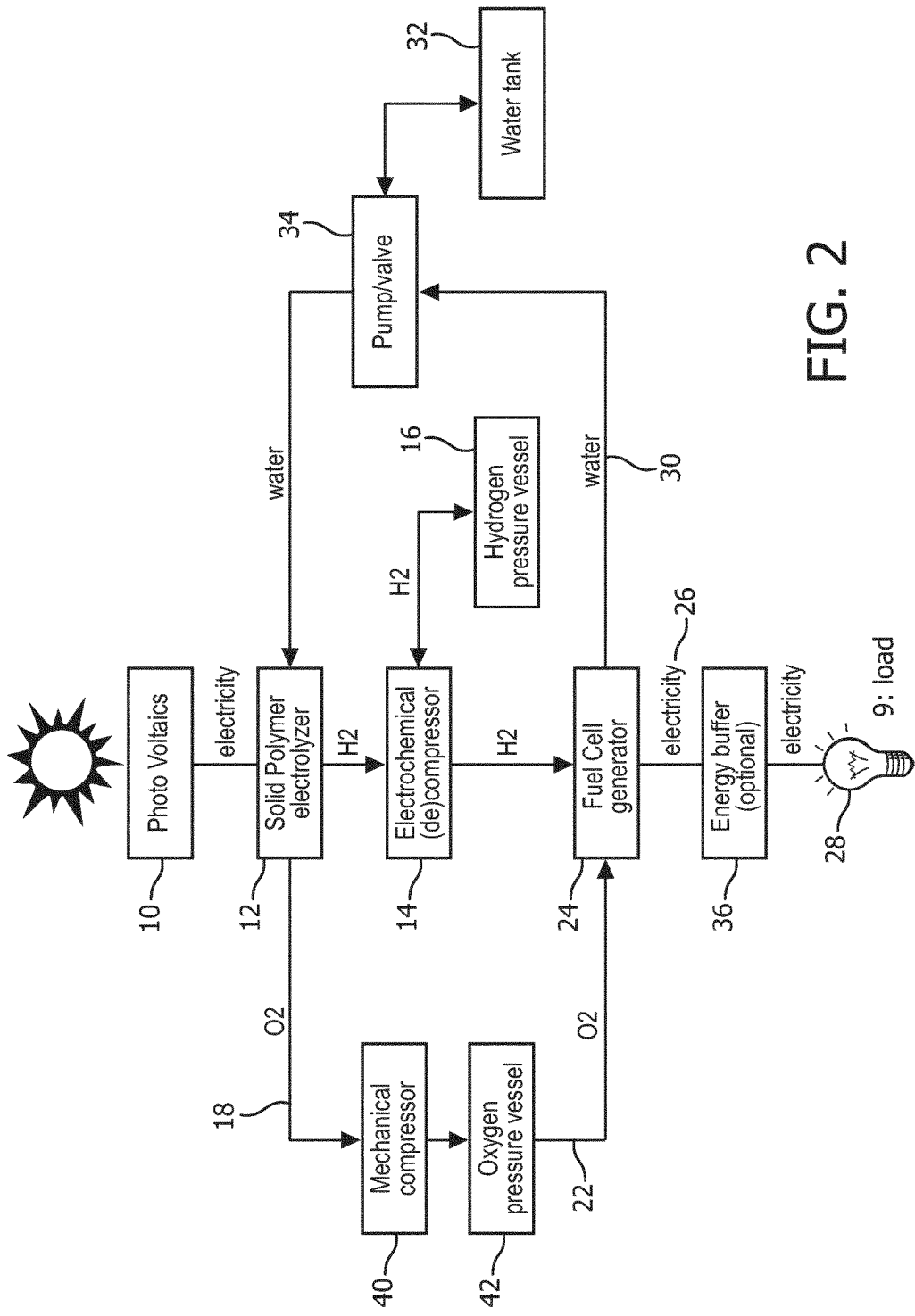
FIG. 2 shows a second example of lighting system to which the invention can be applied.

An example system overview of a second version is shown in FIG. 2 which shows a fully closed RFC system for example OSL application.

The same reference numbers are used as in FIG. 1 for the same components with the same functions.

The difference is that the O2 18 generated by the SPE 12 is not released into the air but using a compressor 40 it is stored in an oxygen pressure vessel 42. When the Fuel Cell Generator 24 is required to create power for the load 28, the Fuel Cell Generator is fed with O2 from the oxygen pressure vessel 42 and H2 from the hydrogen pressure vessel 16. The invention relates to the control of the fuel cell and the battery.

In particular, the invention provides a control system which attempts to keep the system running at a constant power level for as much as possible to extend the life of the fuel cell. The control system implements a strategy when and how it is appropriate to recharge the energy buffer.

The example above relates to a street lighting application.

Figure 3:
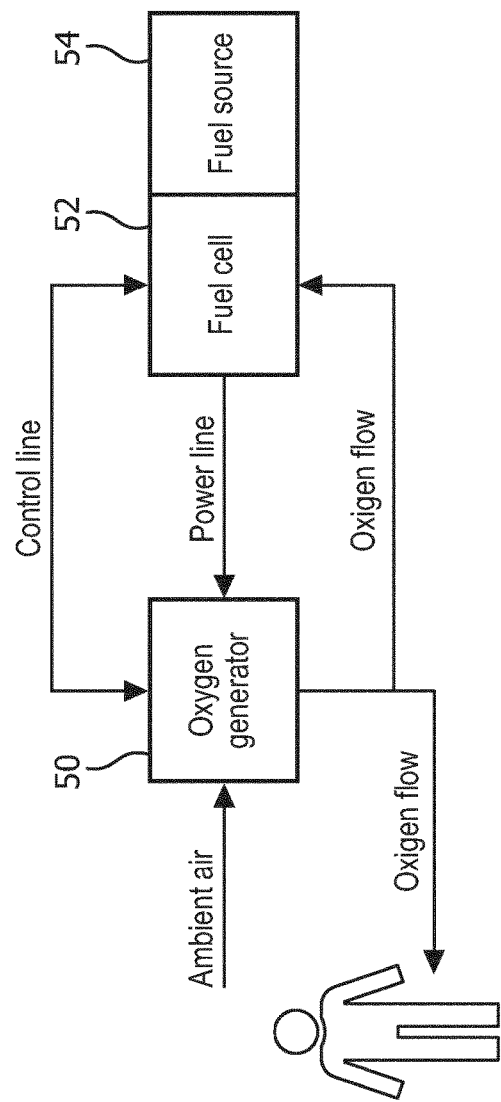
FIG. 3 shows an oxygen generator to which the invention can be applied.

FIG. 3 shows an oxygen generator system which can also be controlled using the approach of the invention.

The system has an oxygen generator 50 for example a sieve bed or fuel cell. The fuel cell 52 provides electrical power for a chemical reaction between a fuel and oxidant, (in the example of a PEM fuel cell, the fuel is hydrogen and the oxidant is oxygen). The fuel source 54 may contain the fuel in gaseous, liquid or solid form. In the example of FIG. 3, there is no regeneration function, and the hydrogen fuel is replenished once it has been used.

The oxygen generator and fuel cell are connected to each other via a control line, so they can exchange data so control can be exerted. The oxygen generator will provide oxygen to a patient, but part of the oxygen it generates is fed to the fuel cell. The fuel cell generates electrical power and delivers this via a power line to the oxygen generator (and possibly other components such as the fuel cell's balance of plant components, a reformer (if the hydrogen supply is reformed from another fuel source) and/or the fuel cartridge, etc. The power line may contain a DC/DC conversion step between the fuel cell and the oxygen generator, which is omitted for sake of clarity.

Figure 4:
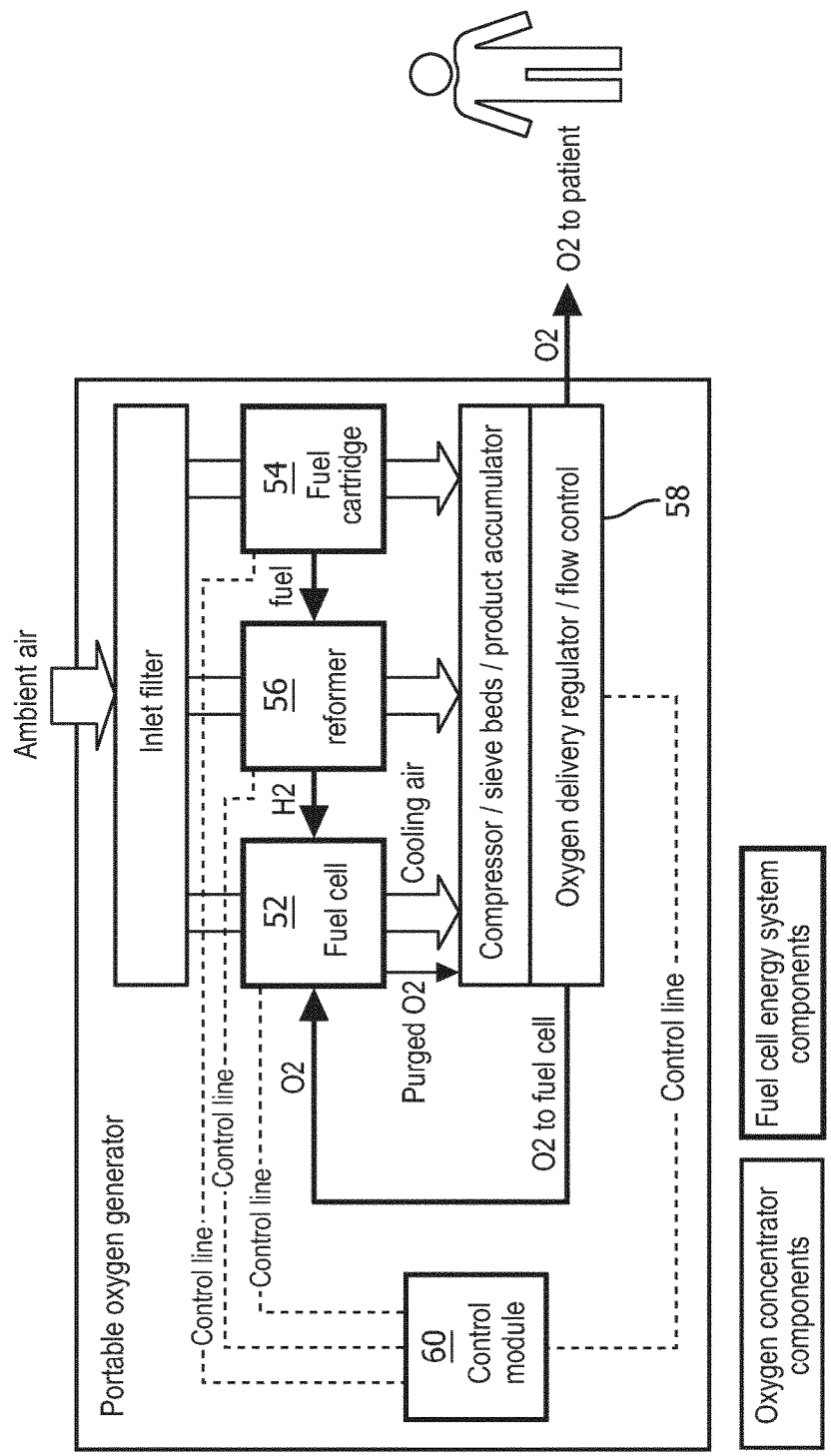
FIG. 4 shows the oxygen generator of FIG. 3 in more detail.

The system is shown in more detail in FIG. 4. This example shows a system with a PEM fuel cell 50 plus reformer 56 using methanol as a fuel. Other embodiments are conceivable as well, such as using a different fuel (e.g. boro hydride) or a different way to store the energy carrier (e.g. hydrogen in pressure vessels or hydrogen bound to another structure, such as metal hydrates) or a fuel cell system with different technology than PEM but still able to use oxygen. The oxygen generator 50 (in the form of a compressor) provides oxygen to the fuel cell 52 and to the patient, via a delivery regulator 58.

The main mechanisms are:

a.) The oxygen generator splits and produces two flows of oxygen to satisfy demand of two sources, being the fuel cell and patient.

b.) A control module 60 balances the oxygen generator, fuel cell and fuel processing for maximized Energy Efficiency.

c.) The compressor 50 draws air over the other components for integrated cooling.

In other examples, the fuel cartridge can contain the hydrogen fuel bound in another substance, which needs to be controlled before release can start to happen, for example metal hydrates. In such examples a reformer may not be required.

The overall system draws in ambient air and delivers oxygen to the patient. The compressor draws in ambient air through a filter and the filtered air is drawn over/through the fuel cell and reformer components, thereby eliminating fans which are normally required to cool the fuel cell fan and the reformer. The control block implements an algorithm to balance the air needs of the oxygen generator and the cooling of each component. The compressor (and sieve bed and product accumulator) generates enough oxygen to satisfy demand from the fuel cell and patient: the control block balances supply and demand under varying conditions. The oxygen delivery regulator/flow control is commanded by the control block to deliver the oxygen in the desired pattern, which may be constant or pulsed.

If the fuel cell power generation is throttled, the control block can control the fuel cell inputs, which may concern fuel supply (i.e. hydrogen) and oxidant supply (i.e. oxygen). In case the hydrogen is generated from another energy carrier, the control block will also control the reformer and/or fuel cartridge. The system includes a battery (not shown) for start-up.

The invention relates to periodically lowering the power level of the fuel cell to extend the life of the fuel cell. Thus, the same approach as applied to the lighting application can be applied to the oxygen generator application.

The invention can thus be applied to both of these possible applications, and to other possible applications.

In general, the invention relates to systems which incorporate a fuel cell and a battery, and relates to control of the system to extend the lifetime of the fuel cell and/or the battery. Any fuel cell system needs at least a small battery to start up the fuel cell and possibly also the reformer (if present) and initiate the flow of fuel and oxygen. Even if there is a solar energy supply, there may not be enough electricity from the Photo Voltaics alone.

It is known that Li+ batteries have longer service life if they are not immediately charged after they have been discharged. The life of batteries can be extended by over dimensioning, which adds cost, volume and weight.

In a first approach of the present invention, the operation of both the fuel cell stack and battery are driven for maximum battery life.

This approach of the invention will be described in more detail in connection with a lighting system. Often, a constant, flat production of electricity is optimal for a fuel cell design (i.e. a constant delivery of electrical power in the case of a constant load). This limits the degradation and results in higher voltages at the end of life and therefore in longer life. The life of a fuel cell system can thus be extended by preventing the fuel cell from having to alter its power settings over longer timeframes.

However, modern light control applications use adaptive dimming. A simple dimming procedure limits the light in a particular timeframe, mostly in the middle of the night. A more complex dimming procedure would dim the light to low levels and turn it to full brightness once (e.g. human) motion is detected in the vicinity of the light point and dim the light again once the object has moved away. Such modern (adaptive) dimming systems would cause the fuel cell to have to alter its power almost constantly and this is counterproductive to reach long life. Fuel cells can be over dimensioned to cope with end of life voltage and current requirements, but this can be costly.

Adaptive dimming systems are aimed at reducing power consumption by varying lighting levels to suit activity levels. By varying the levels of lighting during non-peak periods significant power can be saved. Essentially, the higher the level of pedestrian activity, the higher the level of lighting recommended.

If an adaptive dimming profile requires that the light is turned to full brightness, the additional power can come from the battery and the fuel cell power output is unaltered. However, simply adding a battery adds weight and cost.

The approach of the invention provides intelligent life extension techniques for fuel cells and batteries, for example in an adaptive dimmed lighting system. This enables over dimensioning of the fuel cell to be limited and the energy efficiency of the fuel cell system to be increased by running at lower power settings. Over dimensioning of the battery can also be limited, by refraining from immediate recharge after the battery was depleted. Since the fuel cell can provide power during the time when the battery is relaxing to reach equilibrium, the battery does not require immediate recharge and battery life can be extended. This in turn can give a reduction in weight and cost.

Thus, fuel cell life is extended by using the battery capacity in a way that enables the fuel cell output to be flattened over time.

The fuel cell is used for a first supply of electrical power to the load during a first supply time period, wherein the first supply is constant over the first supply time period. The battery is used for a second supply of electrical power to the load during a second supply time period, wherein the second supply varies over the second supply time period.

By providing a constant power supply from the fuel cell, the fuel cell life can be extended.

The battery life can also be extended. This can be achieved by only discharging to a certain level and only charging to a maximum voltage below the maximum voltage to which the battery can be charged. The charging range will depend on the battery technology used. A delay can also be imposed between the discharge and recharge cycles.

Figure 5:
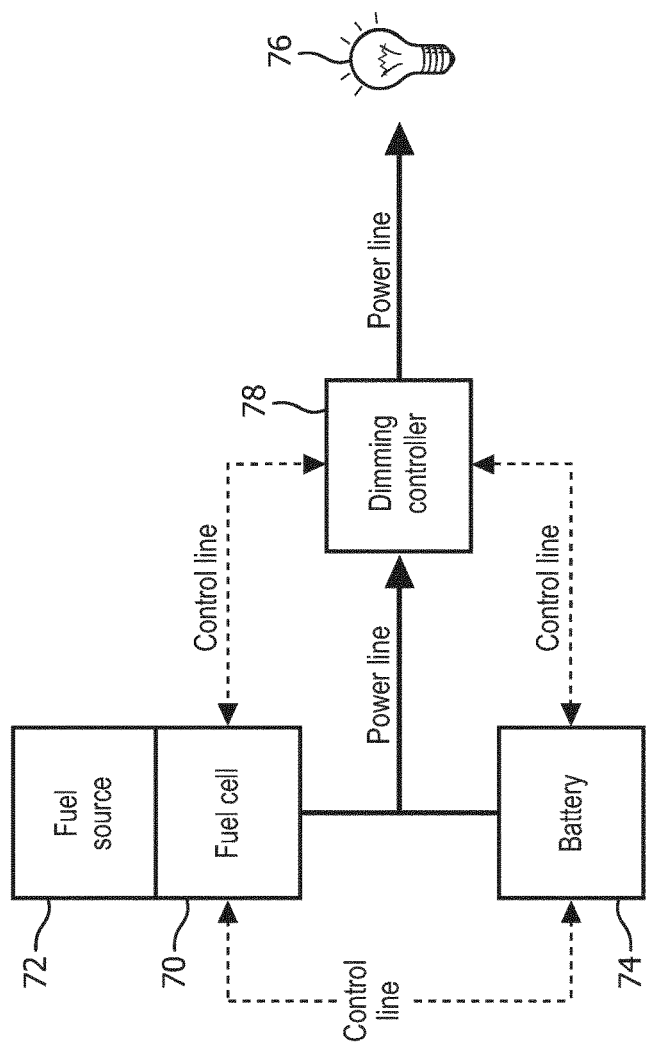
FIG. 5 shows a lighting system in accordance with the invention.

FIG. 5 shows a lighting system which is controlled in accordance with the invention. The system comprises the fuel cell 70, which provides electrical power from a chemical reaction on a fuel and oxidant, (in the example of a PEM fuel cell, the fuel is hydrogen and the oxidant is oxygen). The fuel source 72 may contain the fuel in gaseous, liquid or solid form. The battery 74 provides electrical power for the fuel cell to start up and/or power (wholly or partially) the light 76. A dimming controller 78 runs a fixed and/or adaptive dimming protocol and communicates to the fuel cell and battery to align the energy supply and demand. The light 76 is controlled under management by the dimming controller.

The dimming controller, the battery and the fuel cell are connected to each other via control line, so they can inform each other with data so control can be exerted.

Another aspect of the invention is that a control block implements an algorithm to determine how deeply the battery is discharged and can decide to stop discharging. Battery literature suggests models how to determine a state of charge of a battery. The control algorithm will subsequently decide to stop discharging the battery, meanwhile using the fuel cell for all the required power, and wait until the battery is in equilibrium.

A fixed time period can be used for this purpose, or else a feedback approach can be used, for example based on monitoring EMF or voltage.

Once that point in time is reached, the battery is charged by the fuel cell stack with a constant current charging scheme. To achieve this, the fuel cell may temporarily increase its power delivery. The charger may only complete the constant current phase, and not complete the constant voltage phase. In this way, the fuel cell can avoid the setting where the power needs to gradually decrease during the constant voltage phase.

There is the benefit that charging to a less full charge will extend the battery service life, in particular for Li-ion batteries, where a lesser state of charge extends the life. For lead batteries, a partial state of charge is instead not desired.

Pt cathodes in fuel cells may suffer minor reversible cell voltage degradation by platinum hydroxide build up. This can be minimized by alternating between two current densities or voltages and stay there for several hours. A known example is to alternate between 850 mV/cell for 2 hours and 700 mV/cell for 10 hours, but actual values may differ. The approach comprises combining the short time of high fuel cell operation to additionally do a battery charge in constant current mode, and disregard the constant voltage mode. Thus additional operating modes to those described above can be added in dependence on the fuel cell design.

By hybridizing the fuel cell stack with a battery, and implementing an integrated control algorithm, both components can increase overall life. Thus, the optimal working schemes are combined for fuel cell operation and battery charging.

Figure 6:
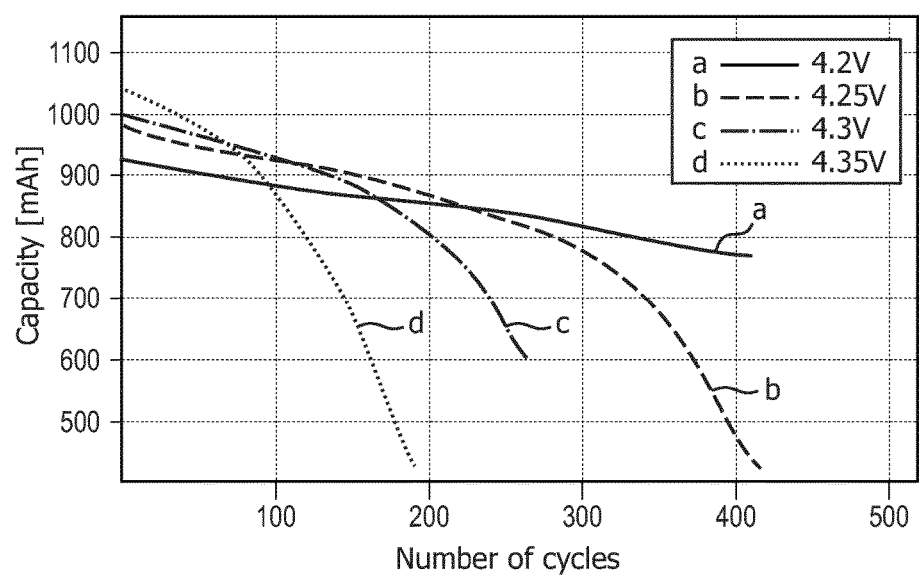
FIG. 6 shows how the level to which a battery is charged influences the battery life.

FIG. 6 shows how charging batteries not completely (i.e. to a lower voltage) extends the battery life, as expressed by the number of charging cycles.

Figure 7:
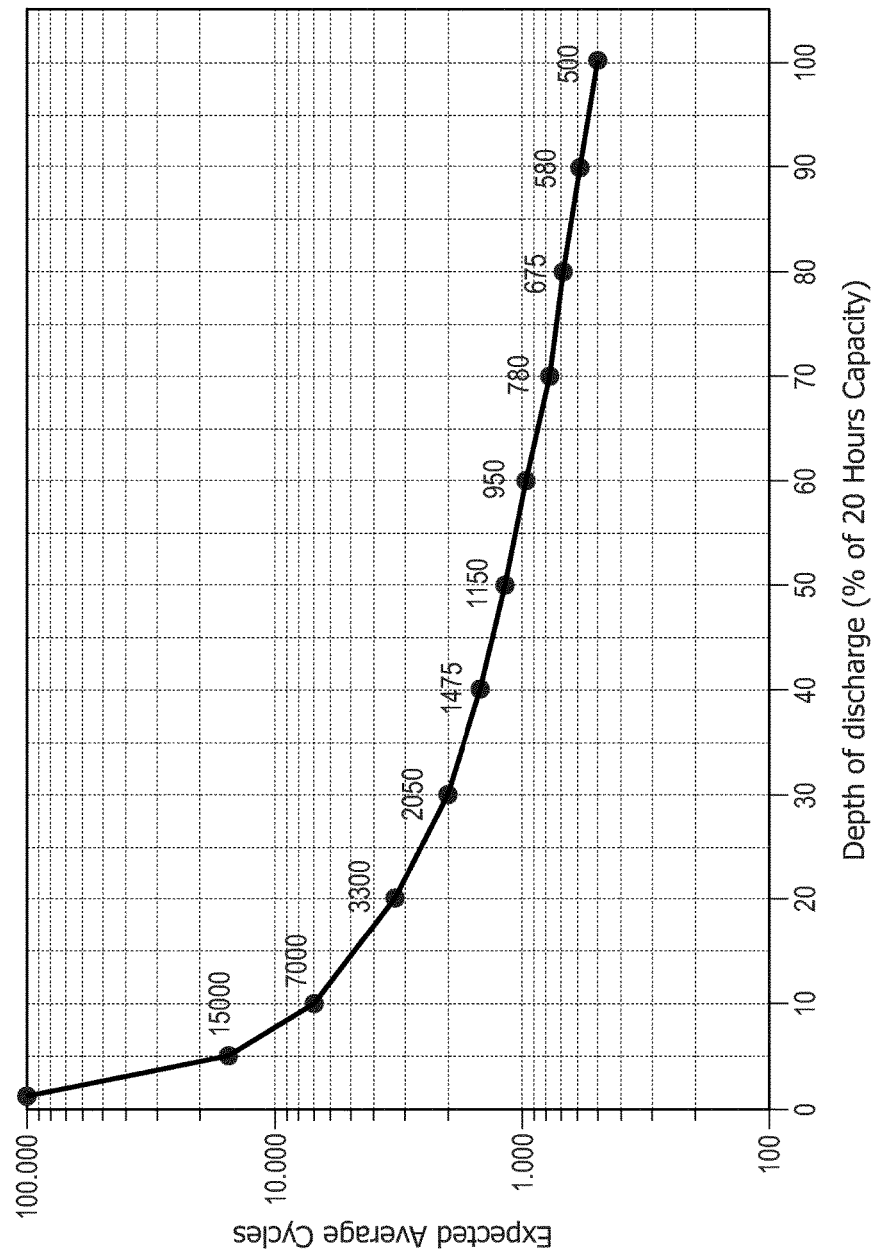
FIG. 7 shows how the level to which a battery is discharged influences the battery life.

FIG. 7 shows that discharging batteries less deeply also extends battery life.

One example of the possible control of the lighting system using the method of the invention will now be described in more detail.

Figure 8:
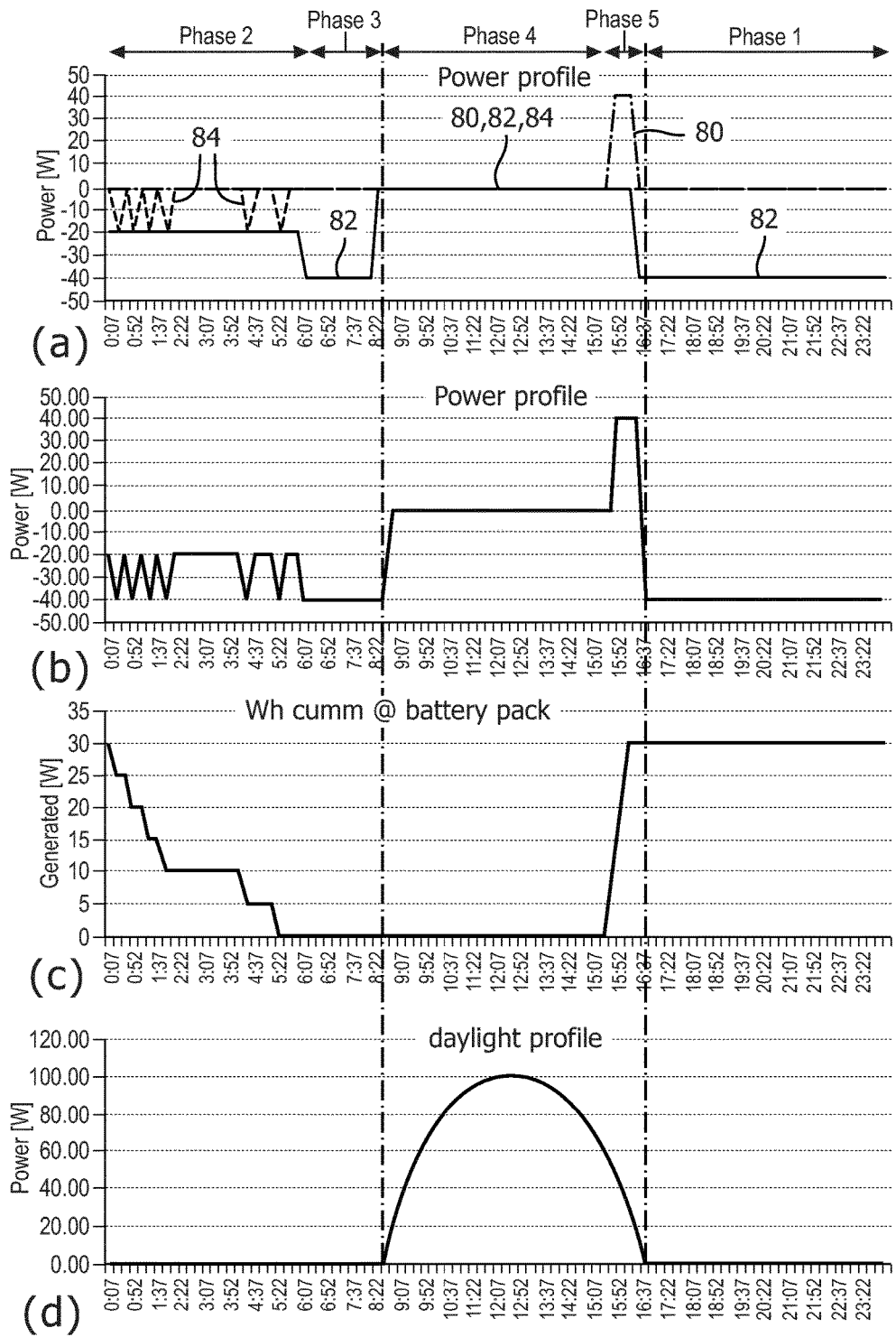
FIG. 8 shows power and light profile graphs for use of the lighting system of the invention in the winter.

FIG. 8 shows four timing diagrams. In FIG. 8(a), plot 80 shows the fuel cell being used to charge the battery. Plot 82 shows the fuel cell being used to drive the load. Plot 84 shows the battery being used to drive (whole or part of) the load A positive power represents charging of the energy buffer (i.e. battery) and a negative power represents power being used to drive an energy consumer (i.e. another device). The plot 80 thus has a positive peak corresponding to battery charging, whereas plot 82 is always negative or zero, since it is always used to deliver power.

FIG. 8(b) shows the overall power delivery to the load from the fuel cell and battery combination. The negative power represents the power drawn by the load from the battery and fuel cell, and the positive power peak is the battery recharging.

FIG. 8(c) shows the cumulative power delivered to the battery pack and retrieved from the battery pack. It shows in simplified form the state of charge of the battery pack.

FIG. 8(d) shows the daylight profile and shows the power that can be generated by the solar charger from solar insolation during daylight.

FIG. 8 is in respect of a winter time period.

The plots are divided into 5 phases, in a cyclic manner. Phase 1 is shown after phase 5, but it also precedes phase 2, Phase 1 is normal operation, with the fuel cell providing complete power for the load. The output power is constant, as the load (i.e. light) is run at e.g. full brightness and not e.g. dimmed.

Phase 2 is a recover mode, wherein the fuel cell drops powers to recover, and any required peaks for adaptive dimming are provided by the battery.

Phase 3 is normal operation, after the fuel cell has recovered and can again provide complete power for the load.

Phase 4 is with the fuel cell switched off. The battery may be recharged by a solar charger for example, after a pause so that the battery can cool down.

Phase 5 shows the battery being recharged by the fuel cell, if not done so already during the day by the solar charger.

In the above phases, phase 1 can be considered to be first supply time period when electrical power is supplied to the load by only the fuel cell and with a constant power. This constant power can for example be a maximum power supply level for the fuel cell. Phase 2 can be considered to be a second supply time period (although they do not need to be sequential) in which the secondary power supply (battery) is used to supply electrical power to the load in addition to a constant contribution from the fuel cell. The battery contribution is variable. Because the battery provides a contribution, the fuel cell power delivery is reduced compared to the first supply time period, i.e. below the maximum power supply level of the fuel cell. Phase 4 can be considered to be a third supply time period in which the fuel cell delivers no power.

In this way, the battery allows the fuel cell to have a recover phase, which is at a lower power level and uninterrupted by periodic peaks from adaptive dimming. These periodic peaks are provided by the battery.

The recovery phase is desirable because after a period of time at a constant power level (e.g. a number of hours) a PEM fuel cell will build up hydrogen hydroxide. This can be reduced by reducing the power level by for a period of time, again typically a number of hours. The required time will depend on the fuel cell size and parameters.

The fuel cell enables the battery to be recharged to an ideal state of charge once it has cooled down enough, irrespective of whether the solar charge can charge the battery enough or perhaps not at all.

Figure 9:
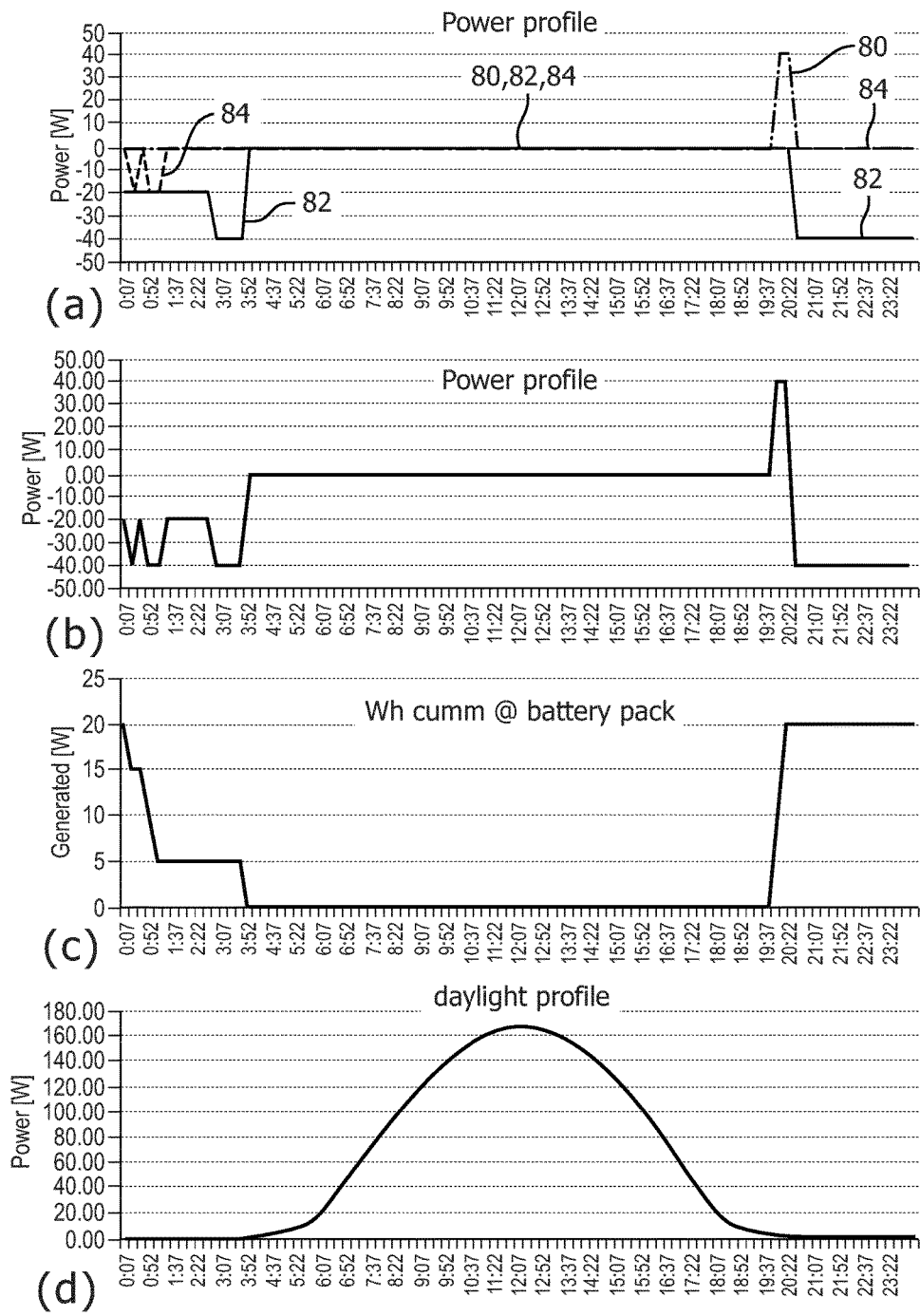
FIG. 9 shows power and light profile graphs for use of the lighting system of the invention in the summer.

FIG. 9 shows the same plots as in FIG. 8, but in a summer time period.

Figure 10:
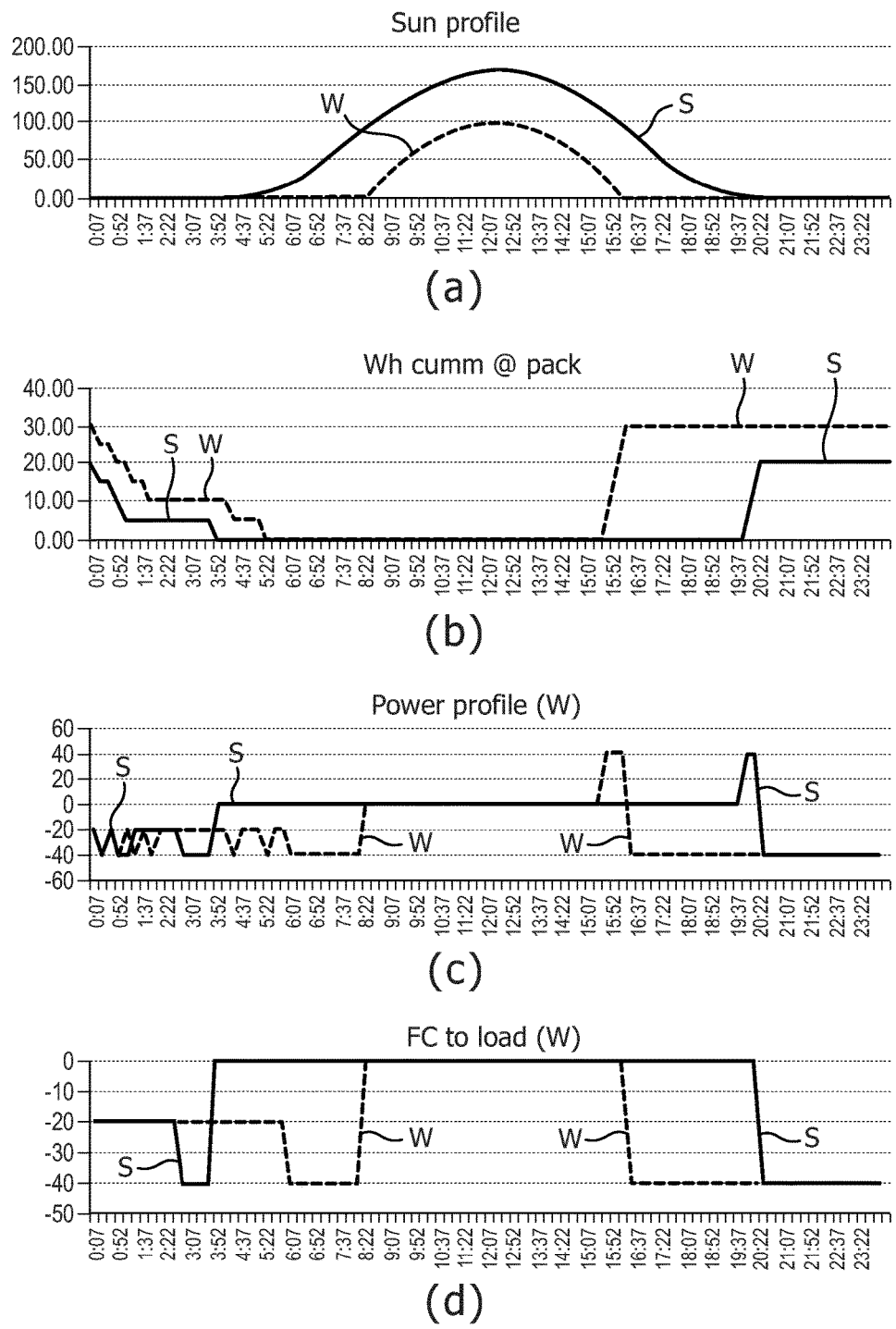
FIG. 10 shows a compilation of summer and winter information.

FIG. 10 shows a comparison between summer and winter operation. The summer plots are labelled S and the winter plots are labelled W.

FIG. 10(a) shows the overlaid sun profiles.

FIG. 10(b) shows the overlaid cumulative powers.

FIG. 10(c) shows the overlaid overall power profiles.

FIG. 10(d) shows the overlaid plots of the fuel cell power provided to the load.

FIG. 10(d) shows most clearly the advantage of the invention. The fuel cell output power is constant during the different time periods. There is a full power time period (phases 1 and 3), an intermediate power time period (phase 2) and an off time period (phase 4). The off time period remains optional, so this invention also applies to a system running the fuel cell continuously without being switched off between a 24 h day-night cycle. The intermediate power time period corresponds to the adaptive dimming period, and the constant power contribution is provided by the fuel cell, and the variable adaptive contribution is provided by the battery.

It can be seen from a comparison of the summer and winter profiles that the durations of the first, the second and/or third supply periods and the corresponding power levels are changed in dependence on the time of year. This can be automatic based on input to the control system indicating the time of the year, and information about the sunrise and sunset times over the course of the year for the particular location.

FIGS. 8 to 10 show that the fuel cell output is constant during the adaptive dimming period. This reduced power mode can be programmed longer than the period where the fuel cell needs to actually recover. The fuel cell needs fuel to be powered, and creating this fuel in the case of a regenerative fuel cell also takes power. If that power for fuel cell refueling is to come from photovoltaics, it is also desirable to limit the refueling so that the photovoltaics can be downsized. Thus, there is a trade-off between the battery size to support the load during the reduced fuel cell power output period, and the photovoltaics for powering fuel cell refueling. Battery over dimensioning is limited by providing a steady charging and full recharge after discharge by means of the fuel cell, which is not possible by charging using photovoltaics.

The combination of fuel cell, photovoltaic generation of power for fuel cell refueling, and battery charging using the fuel cell thus enables an improved system to be obtained.

The system enables the fuel cell to be kept at the same power level (the high power level, the low power level for regeneration or off when no load is present) whatever the circumstances.

The way the invention can be applied to an oxygen generator will now be described, with reference to FIG. 3.

The approach described above of extending the service life of the fuel cell and the battery pack by controlling the level of charging and discharging of the battery can again be applied.

In the oxygen generator approach, the oxygen flow for fuel cell and patient can be split, in order to balance the patient and fuel cell oxygen demand. The usage behaviour of the oxygen therapy is then also taken into account in order to extend the life of the battery and fuel cell. A remaining runtime indication can be provided. The more efficient control enables downsizing of the battery and fuel cell system while also providing longer service life.

As shown in FIG. 4, part of the generated oxygen is routed to the fuel cell 52 for better performance and enhanced life by avoiding CO poisoning of the fuel cell. While the use of oxygen for a (PEM) fuel cell is not new, the system is required to share oxygen production for the patient and the fuel cell demand. The control module 60 implements a feedback loop between the oxygen flow control and the required fuel cell performance, which interacts with the oxygen production level as selected by the patient via a user interface.

The control block 60 also implements a feedback loop between the required power delivery from the fuel cell to the system. This control will always provide enough oxygen to the patient and to the fuel cell.

The oxygen generation can be split into two flows with separate pressure. The patient is likely to consume oxygen at 1 bar atmospheric, but the oxygen flow to the fuel cell may be of higher pressure. This may increase the energy efficiency of the fuel cell.

The excess oxygen may be purged from the system or re-injected into the oxygen generation cycle.

The system needs to balance patient and fuel cell oxygen demand. It is imperative that the system can determine the needs of both fuel cell and patient over different power/oxygen generation settings. The end user of the portable oxygen generator may select different settings with higher or lower oxygen volumes. This selection will result in higher or lower power generation requirements to the fuel cell. A higher oxygen generation setting for the patient will require more electricity production from the fuel cell and, in effect, will create higher fuel cell demand for oxygen and also fuel. A lower oxygen generation setting will consequently require lower electricity production and consequently lower demand for oxygen and fuel.

The control block implements an algorithm to balance the total oxygen production volume with the demands of both the patient and the fuel cell, in conjunction with production of sufficient fuel for the fuel cell. Varying power generation in the fuel cell (i.e. throttling of fuel cell performance) can be achieved by multiple ways such as varying the flow rate of the reactants (fuel/hydrogen and oxidant/oxygen) or varying the operating pressure. Naturally, if the fuel cell stack is throttled, this indirectly also drives the production of fuel by the fuel processor controlling the reformer and/or fuel cartridge.

A more advanced control algorithm can balance the amount of oxygen required by the patient and fuel cell at different pressures and volumes, whereas the pressure for the patient may remain atmospheric.

In an alternative control approach, the fuel cell can run at optimal working point to extend service life. The fuel cell is dimensioned to be able to provide all the electricity for all modes of operation. Multiple modes are conceivable:

Under a "normal" mode of operation, the fuel cell system can provide all the electricity for the highest patient oxygen setting. The fuel cell is actually over dimensioned for such cases. In these modes, the fuel cell stack will be operated at a lower working point on the polarization curve to extend the service life. During the most commonly used use cases of the low and medium volume settings, the fuel cell only provides part of the electrical power for the patient's oxygen demand. It could provide more electrical power, but will not do this.

If the highest oxygen selection setting is requested by the patient, the fuel cell could but will not provide all power, but only a major part, and at least initially. The limited but missing additional power will be provided by the battery, which is dimensioned to support that additional power requirement for a limited time. Once the battery is reaching the point in time where it will soon be depleted, the fuel cell system may shift to an "emergency" mode where it works at higher power, i.e. on a different working point of the polarization curve.

The idea is that the operating modes at highest oxygen generation setting will be used so sparsely, that the usage will yield an extension of the life of the fuel cell stack and not degrade the battery's service life too much. The system can preferably access the logged user behaviour of the oxygen demand settings as well as the fuel cell demand.

The system uses algorithm to keep the battery always in a ready state as to contain enough charge to provide the additional emergency power upon request. To achieve this the system will use logged behaviour about the run times and patient's oxygen generation selections to predict the required behaviour and control the working points of the fuel cell to extend the service life and to predict the point where the system will charge the battery. The aim is to keep the fuel cell in a working mode for optimal service life as much as possible. One example of the possible control of the oxygen generating system using the method of the invention will now be described in more detail.

Figure 11:
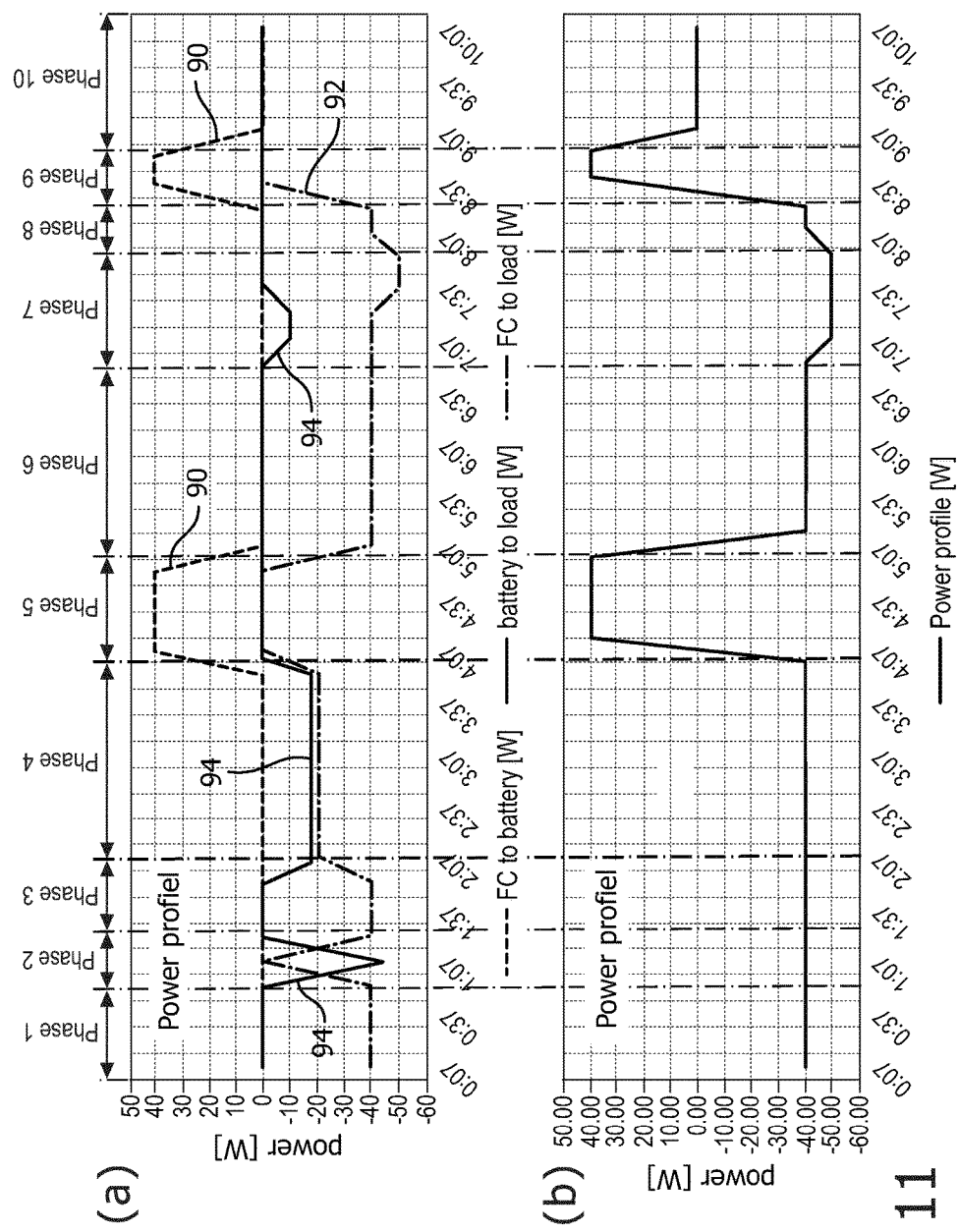
FIG. 11 shows power and oxygen use profile graphs for use of the oxygen generator system of the invention with a first fuel cell capacity.
Figure 11:
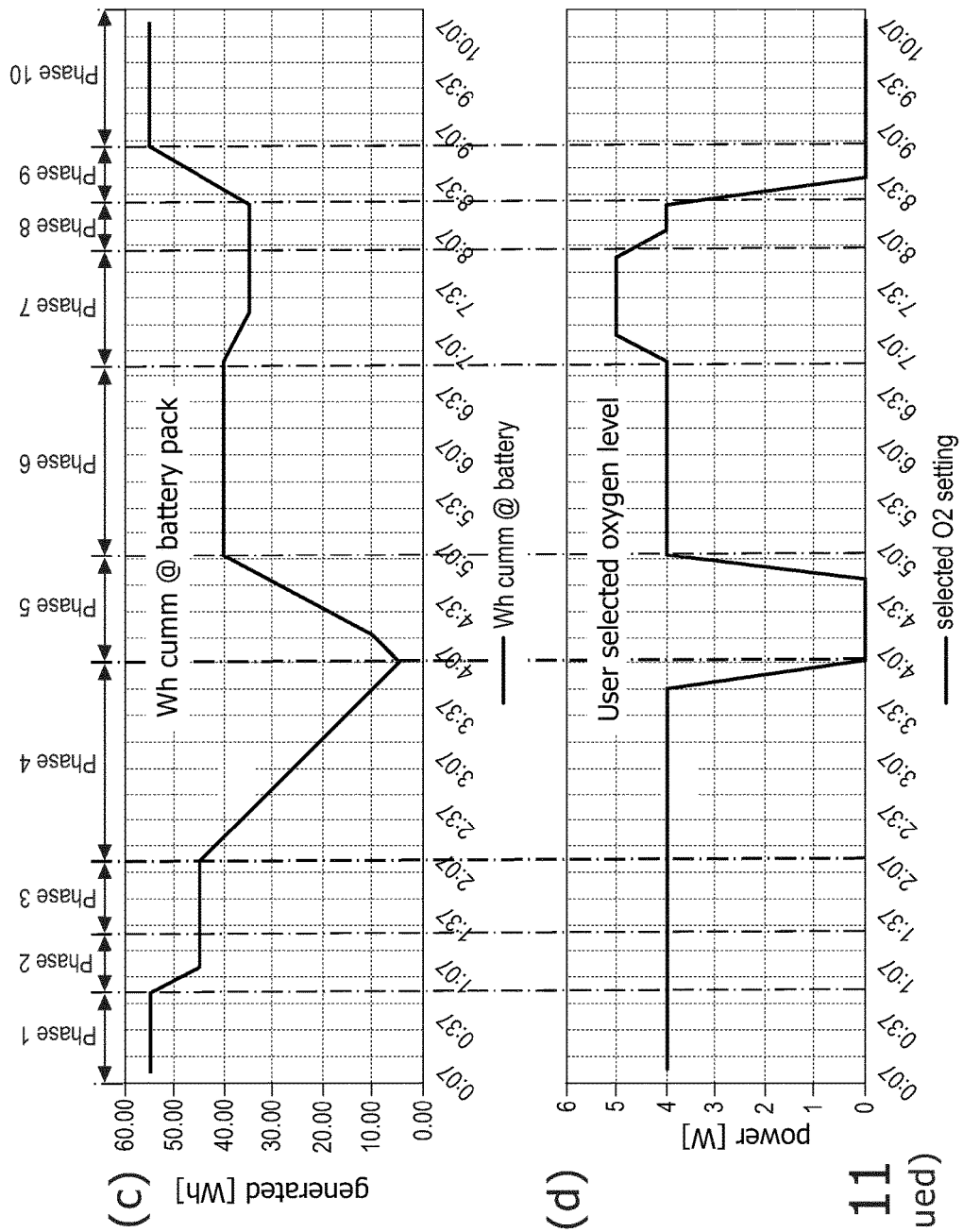

FIG. 11 shows four timing diagrams, using the same approach as in FIG. 8. Nine phases are shown, and these are explained below.

In FIG. 11(a), plot 90 shows the fuel cell being used to charge the battery. Plot 92 shows the fuel cell being used to drive the load. Plot 94 shows the battery being used to drive (whole or part of) the load Again, a positive power represents charging of the energy buffer (i.e. battery) and a negative power represents power being used to drive an energy consumer (i.e. another device). The plot 90 thus has a positive peak corresponding to battery charging, whereas plot 92 is always negative or zero, since it is always used to deliver power.

FIG. 11(b) shows the overall power delivery to the load from the fuel cell and battery combination. The negative power represents the power drawn by the load from the battery and fuel cell, and the positive power peaks are the battery recharging.

FIG. 11(c) shows the cumulative power delivered to the battery pack and retrieved from the battery pack. It shows in simplified form the state of charge of the battery pack.

FIG. 11(d) shows the user selected oxygen level.

FIG. 11 represents a system where the fuel cell is dimensioned to be able to provide all power for the maximum oxygen production level.

Phase 1 is normal operation on a user selected oxygen setting (i.e. oxygen production level) number 4. The fuel cell produces all power.

Phase 2 represents a period when the fuel cartridge for the fuel cell is swapped. The power is fully provided by the battery, and the system continues to produce oxygen at selected level #4.

Phase 3 is a return to normal operation on the user selected oxygen setting (i.e. oxygen production level) #4, the fuel cell again produces all power.

In Phase 4, the system throttles back the fuel cell to a lower level to recover the fuel cell, and power is partially provided by the battery. The system continues to produce oxygen at selected level #4.

In Phase 5, the user selects the system oxygen level to level #0, so that the system is switched off. The fuel cell then provides power to recharge the battery, and the system produces no oxygen.

Phase 6 shows a return to normal operation on the user selected oxygen setting (i.e. oxygen production level) #4. The fuel cell produces all power.

Phase 7 shows the user selecting an "emergency" oxygen setting (i.e. maximum oxygen production level) #5. Initially the fuel cell does not produce all the power and power is partially provided by battery. This is to avoid the maximum fuel cell power level to prolong life. After a while, when battery is predicted to be empty, the fuel cell produces all the power, and the system continues to produce oxygen at selected level #5.

Phase 8 shows a return to the normal operation on user selected oxygen setting (i.e. oxygen production level) #4, and the fuel cell produces all power.

In Phase 9, the user selects the system oxygen level #0 or the system is switched off. The fuel cell provides power to recharge battery, and the system produces no oxygen. In phase 10 the system is off.

In the above phases, phase 6 can be considered to be first supply time period when electrical power is supplied to the load by only the fuel cell and with a constant power. This constant power can for example be a maximum power supply level for the fuel cell, or it may be slightly below the maximum so that there is a higher power emergency setting as explained above. Phase 4 can be considered to be a second supply time period in which the secondary power supply (battery) is used to supply electrical power to the load in addition to a constant contribution from the fuel cell. The battery contribution can be variable, although FIG. 11 shows a constant contribution. Again, because the battery provides a contribution, the fuel cell power delivery is reduced compared to the first supply time period, i.e. below the maximum power supply level of the fuel cell. Phase 10 can be considered to be a third supply time period in which the fuel cell delivers no power.

The invention resides in particular in phase 4, with recovery of the fuel cell, where part of the load is taken up by the battery with the fuel cell operating on a lower power level, and in phases 5 and 9 where there is recharge of the battery to the ideal state of charge level.

Note that FIG. 11 shows that during phase 4, the oxygen demand is constant. This means that a constant reduced power is provided by the fuel cell and a constant power is provided by the battery. However, if there are fluctuations in demand during this phase, those fluctuations are provided by the battery as mentioned above so that the fuel cell recovery period is not interrupted.

There is an optional pause between the discharge and charge of the battery, to cool down the battery as to prolong life. This is omitted to avoid over complication of the Figure.

Figure 12:
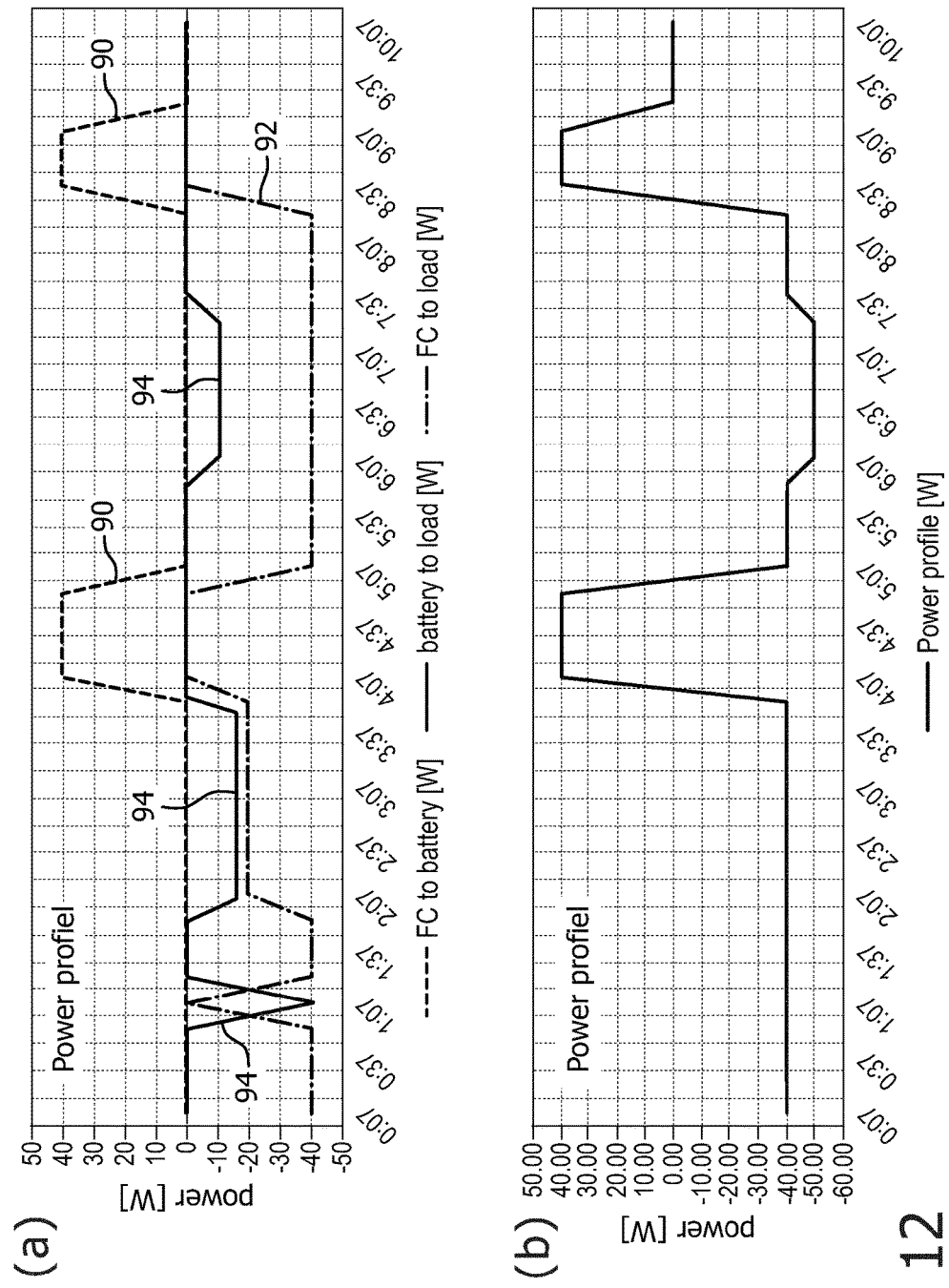
FIG. 12 shows power and oxygen use profile graphs for use of the oxygen generator system of the invention with a second, lower fuel cell capacity.
Figure 12:
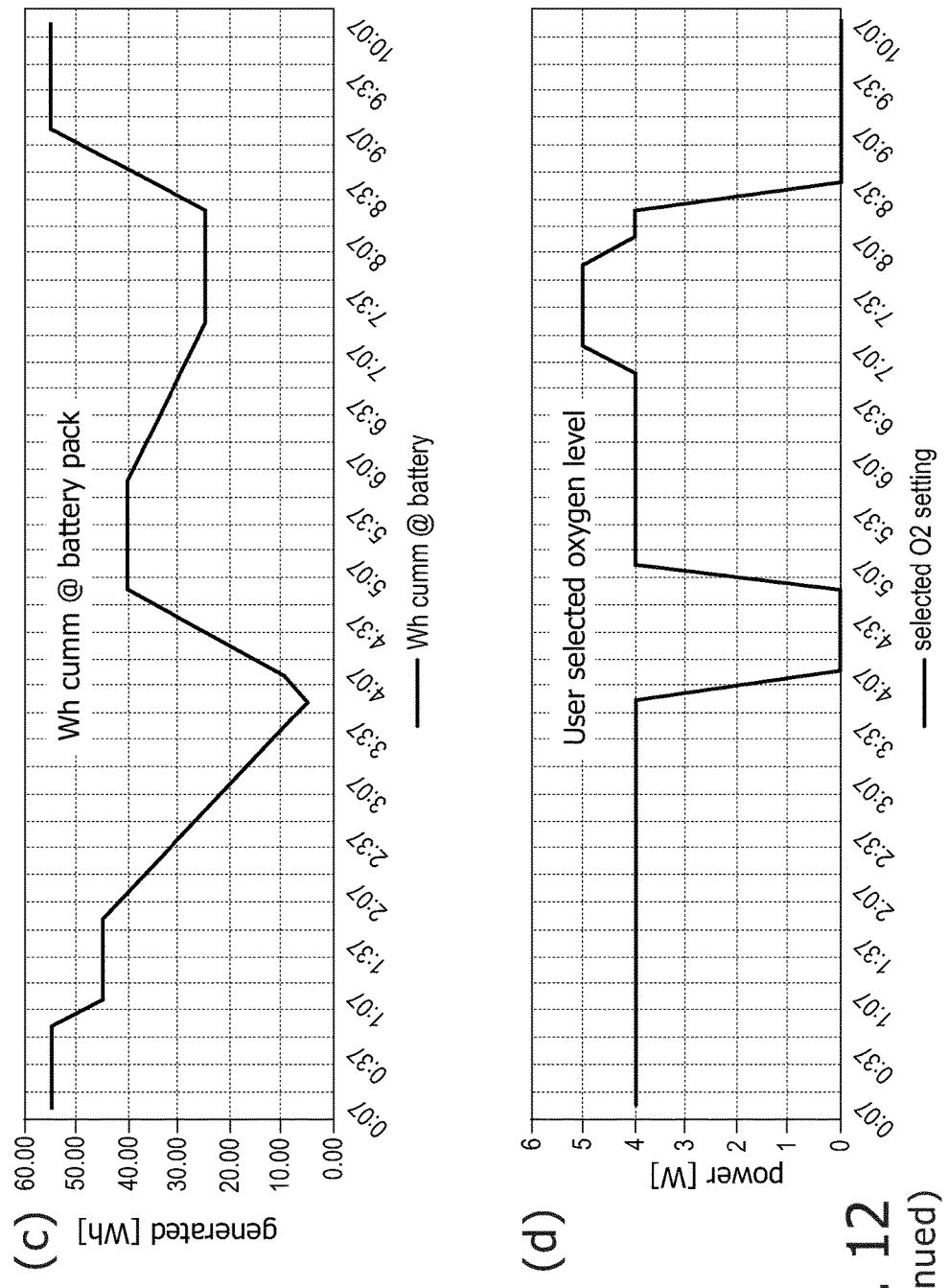

FIG. 12 shows the same plots, but for a system where the fuel cell is dimensioned to provide power only up to level 4, whereas the emergency setting has to be provided from the battery energy storage. It is clear that such a system can only provide emergency oxygen levels for a limited time, but there are cost savings in the reduction of over dimensioning the fuel cell.

The reduction in fuel cell output when throttled back will be chosen depending on the fuel cell design, and the reduction needed to prolong the lifetime. The power may be throttled back to between 20% and 80%, or between 30% and 70%, of the normal maximum power delivery during the first supply time period.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A controller configured to:
    control a supply of electrical power to a load from at least one fuel cell (24) and at least one secondary power supply:
    during a first supply time period, use the fuel cell for a constant first supply of electrical power to the load;
    during a second supply time period, simultaneously use the at least one fuel cell (24) for a constant second supply of electrical power to the load, and use the at least one secondary power supply for an additional second supply of electrical power to the load, wherein the constant second supply of electrical power is lower than the constant first supply of electrical power; and
    wherein the controller is further configured to, in a fourth supply time period different from the fourth and second supply time periods, cease the supply of electrical power from the fuel cell to the load.

2. A controller as claimed in claim 1, wherein the constant first supply of electrical power is the same as the supply of electrical power to the load.

3. A controller configured to:
    control a supply of electrical power to a load from at least one fuel cell (24) and at least one secondary power supply:
    during a first supply time period, use the fuel cell for a constant first supply of electrical power to the load;
    during a second supply time period, simultaneously use the at least one fuel cell (24) for a constant second supply of electrical power to the load, and use the at least one secondary power supply for an additional second supply of electrical power to the load, wherein the constant second supply of electrical power is lower than the constant first supply of electrical power; and
    wherein the controller is further configured to, in a third supply time period after the second supply time period, use the fuel cell for a constant third supply of electrical power to the load wherein the constant third supply of electrical power is higher than the constant second supply of electrical power.

4. A controller as claimed in claim 3, wherein the secondary supply comprises a rechargeable device and wherein the controller is further configured to, in the third supply time period, also use the fuel cell to at least partly recharge the rechargeable device.

5. A controller as claimed in claim 4, wherein the secondary power supply comprises a rechargeable device and the controller is further configured to use the rechargeable device for the additional second supply of electrical power until a predetermined rechargeable device voltage is reached, which predetermined rechargeable device voltage is greater than or equal to a minimum voltage to which the battery can be discharged.

6. A controller as claimed in claim 3, wherein the controller is further configured to use the fuel cell to recharge the rechargeable device to a predetermined maximum voltage which is below the maximum voltage to which the rechargeable device can be charged.

7. A controller configured to:
    control a supply of electrical power to a load from at least one fuel cell (24) and at least one secondary power supply:
    during a first supply time period, use the fuel cell for a constant first supply of electrical power to the load;
    during a second supply time period, simultaneously use the at least one fuel cell (24) for a constant second supply of electrical power to the load, and use the at least one secondary power supply for an additional second supply of electrical power to the load, wherein the constant second supply of electrical power is lower than the constant first supply of electrical power; and
    wherein the secondary power supply comprises a rechargeable device and the controller is further configured to use the fuel cell to recharge the rechargeable device using only a constant current charging.

8. A system comprising:
    a fuel cell for supplying electrical power to a load;
    a secondary power supply; and
    a controller as claimed in claim 1.

9. A system as claimed in claim 8, comprising the load, wherein the load comprises any one of, or a combination of: a lighting unit, an outdoor lighting unit and a street lighting unit.

10. A system as claimed in claim 9, wherein the load is for providing a light output and wherein the system further comprises a dimming controller for varying the light output.

11. A system as claimed in claim 10, wherein the dimming controller is configured such that the varying light output, during at least part of the second supply time period, is a function of ambient light levels.

12. A system as claimed in claim 6, further comprising a solar panel and a system for refueling the fuel cell using the electrical power generated by the solar panel.

13. A system as claimed in claim 12, wherein the system for recharging the fuel cell comprises:
    a water tank for storing water generated by the fuel cell;
    an electrolyser for generating hydrogen from the water;
    a hydrogen storage vessel; and
    a compressor for compressing the hydrogen and providing it to the hydrogen storage vessel.

14. The system as claimed in claim 8, comprising the load, wherein the load comprises an oxygen generator for generating oxygen from ambient air.

15. A method of supplying an electrical power to a load from rom at least one fuel cell and from at least one secondary power, wherein the method comprises:
    during a first supply time period, using the at least one fuel cell for a constant first supply of electrical power to the load; and
    during a second supply time period, simultaneously using the at least one fuel cell for a constant second supply of electrical power to the load, and using the at least one secondary power supply for an additional second supply of electrical power to the load, wherein the constant second supply of electrical power is lower than the constant first supply of electrical power, and wherein the secondary power supply comprises a rechargeable device, and the method comprises supplying electrical power to the battery from the fuel cell to recharge the rechargeable device using only a constant current charging regime.

16. A computer program product, downloadable from a communication network and/or stored on a computer readable medium, the computer program product comprising code which, when run on a computer, implement the method of claim 15.

\* \* \* \* \*